United States Patent [19]
Gliese et al.

[11] Patent Number: 6,049,859
[45] Date of Patent: Apr. 11, 2000

[54] IMAGE-PROCESSING PROCESSOR

[75] Inventors: Jörg Gliese; Ulrich Hachmann; Wolfgang Raab; Alexander Schackow; Ulrich Ramacher; Nikolaus Brüls, all of München; Rene Schüffny, Coswig, all of Germany

[73] Assignee: Siemens Aktiengesellschaft, Munich, Germany

[21] Appl. No.: 09/101,702

[22] PCT Filed: Dec. 13, 1996

[86] PCT No.: PCT/DE96/02404

§ 371 Date: Jul. 15, 1998

§ 102(e) Date: Jul. 15, 1998

[87] PCT Pub. No.: WO97/26603

PCT Pub. Date: Jul. 24, 1997

[30] Foreign Application Priority Data

Jan. 15, 1996 [DE] Germany .............. 196 01 201

[51] Int. Cl.[7] ................................... G06F 15/76
[52] U.S. Cl. ................. 712/17; 712/14; 345/505
[58] Field of Search .................. 712/10, 11, 14, 712/16, 17; 345/505

[56] References Cited

FOREIGN PATENT DOCUMENTS

| 0 280 969 | 9/1988 | European Pat. Off. ........ G06F 15/06 |
| 0 370 792 | 5/1990 | European Pat. Off. ........ G06F 15/62 |
| 0 461 724 A2 | 12/1991 | European Pat. Off. ........ G06F 15/16 |

OTHER PUBLICATIONS

Software statt Hardware Signalverarbeitung in der Videotechnik, pp. 90–94.
A single Chip Highly Parallel Architecture for Image Processing Applications, Johannes Kneip et al., pp. 1753–1764.
Intergrierte Parallelverarbeitung, Dr. Dung Tu, pp. 30–35.
Digital Signal Processing: A System Design Approach, David J. DeFatta et al., pp. 488–496.
Microprocessor Report—UltraSparc Unleashes SPARC Performances, by Linley Gwennap, pp. 5–9.
Conference on Visual Communications and Image Processing (VCIP'94) Chicago, 1994, pp. 1753–1766.
A VLSI Array Processor for Nueral Network Algorithms, by J. Beichter et al. pp. 4.6.1–4.6.3.
Microprocessor Report, Philips Hopes to Displace DSPs with VLIW by Brian Case pp. 12–15.

*Primary Examiner*—John A. Follansbee
*Attorney, Agent, or Firm*—Hill & Simpson

[57] ABSTRACT

The subject matter of the application essentially relates to a matrix array of processor units, each processor unit having, in addition to an arithmetic logic unit and a result register bank, a further arithmetic logic unit, a multiplier/adder unit, a storage unit of a distributed screen section buffer and a local general purpose memory. The processor is distinguished by a high processing speed in conjunction with a small chip area and enables real-time processing even in the case of computation-intensive image processing methods such as 2D convolution, Gabor transformation, Gaussian or Laplacian pyramids, block matching, DCT or MPEG2.

6 Claims, 5 Drawing Sheets

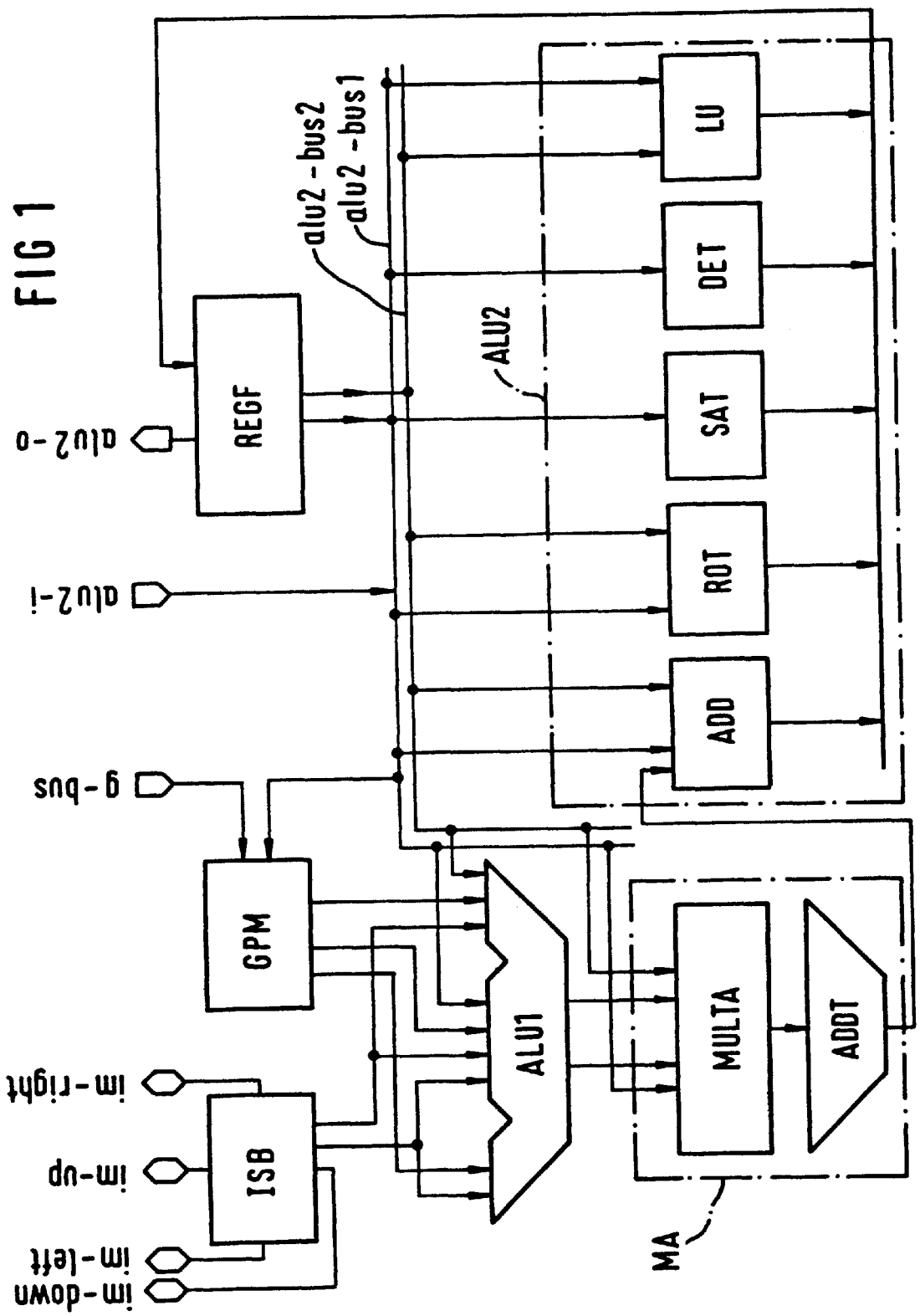

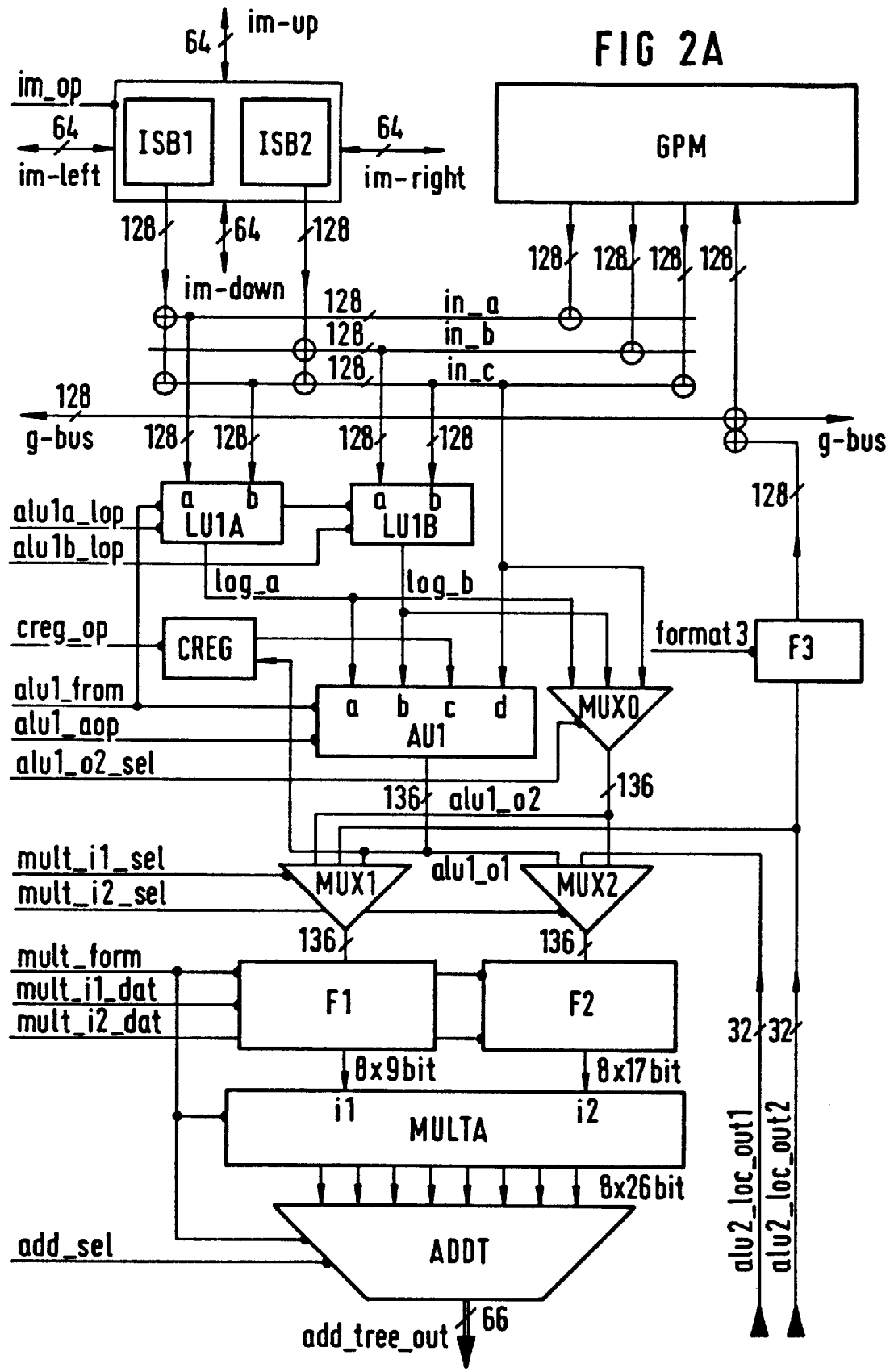

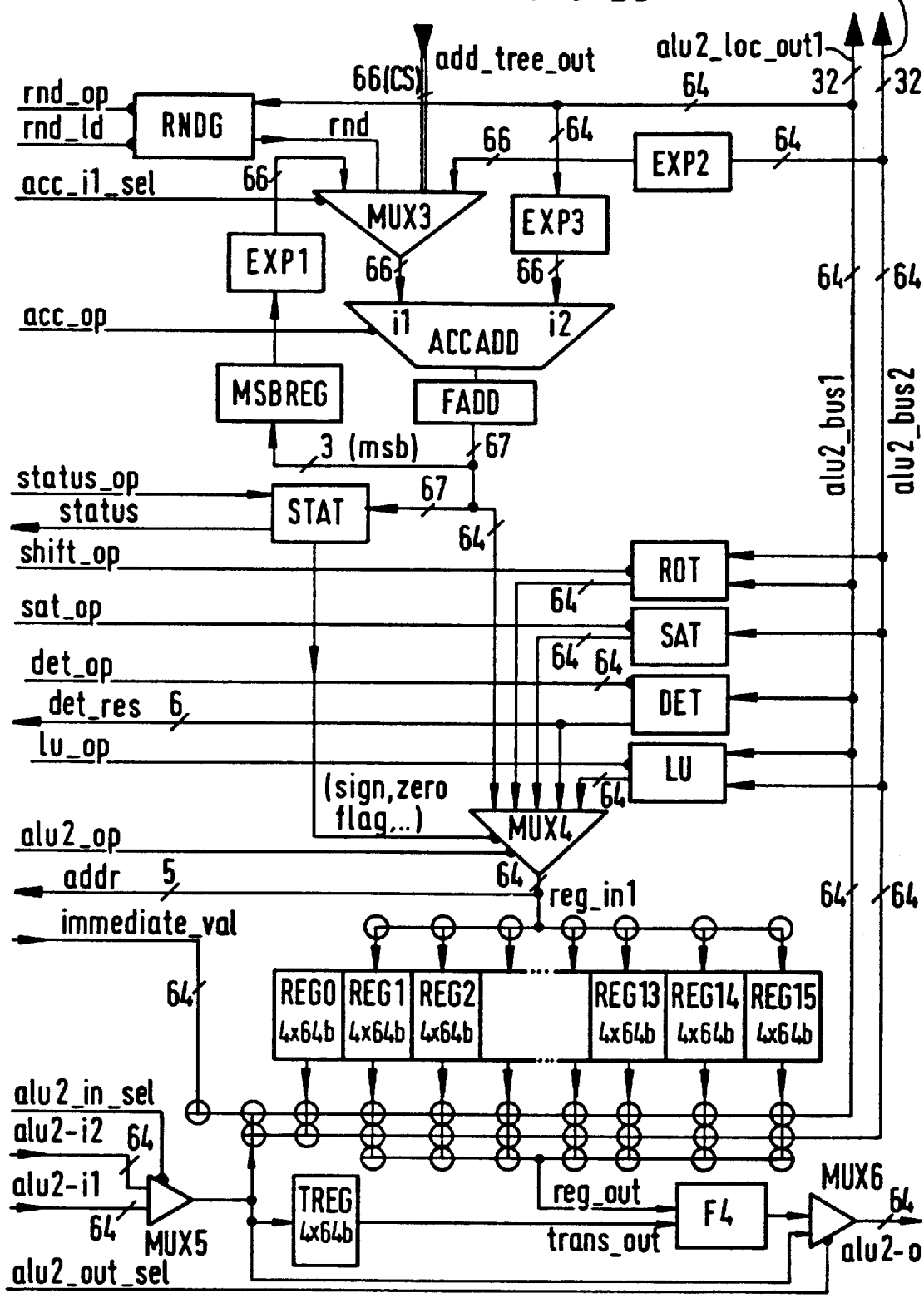

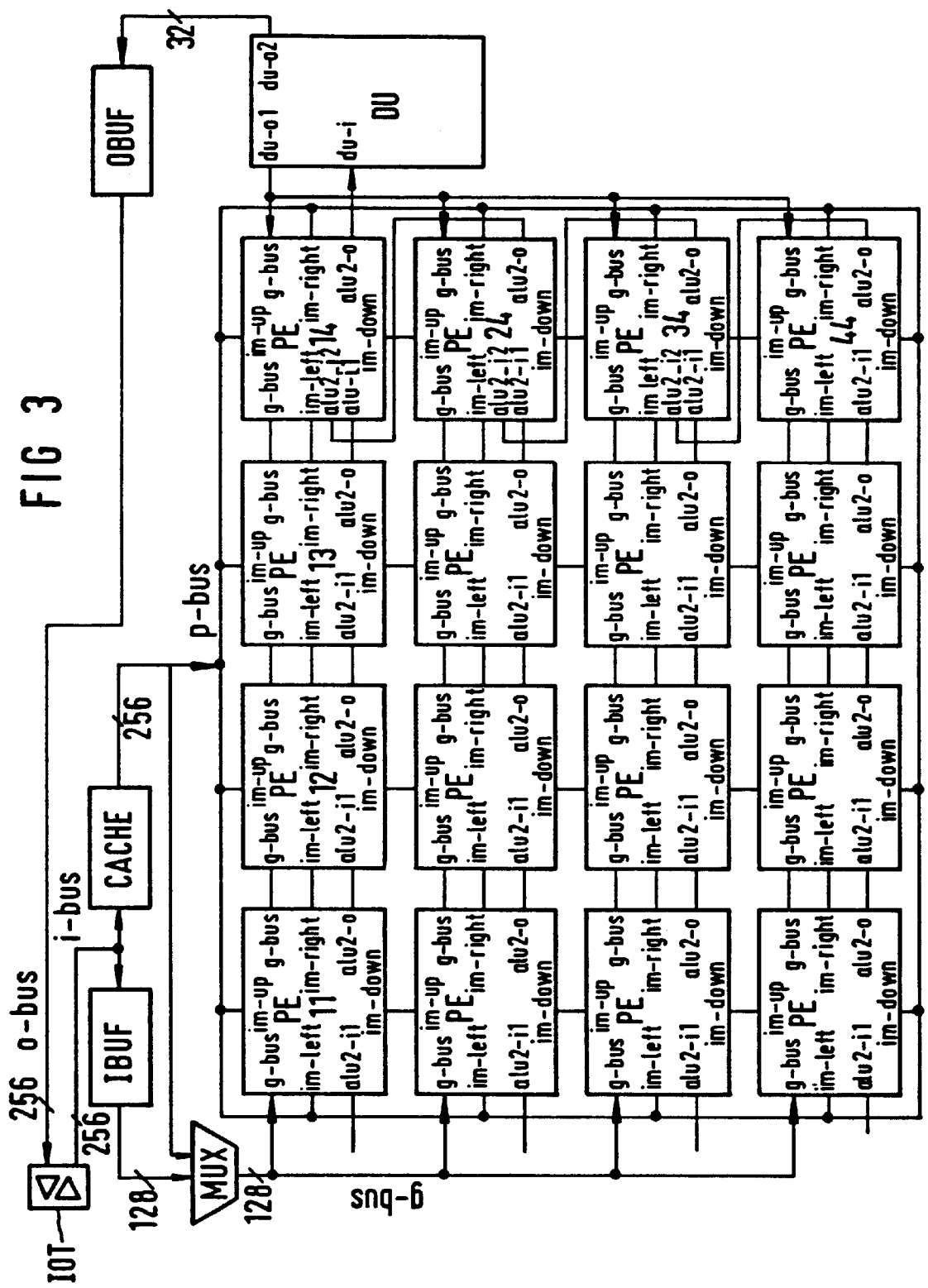

IMAGE-PROCESSING PROCESSOR

BACKGROUND OF THE INVENTION

1. Field of the Invention

The present invention relates to the type of processors which are required for fast processing of computation-intensive algorithms such as, for example, 2-dimensional convolution, Gabor transformation, Gaussian or Laplacian pyramids, block matching, DCT, MPEG2, etc.

2. Description of the Prior Art

The journal Design and Electronic 12 of 06.13.1995, pages 30 to 35, discloses for this purpose an arrangement in which the signal processing algorithms which are critical in terms of computation time are processed by tailor-made programmable special processors. In such processes, the registers are supplied via an on-chip memory and a complicated crossbar switch ensures optimum communication between the on-chip memory and the processors. Disadvantages here are the relatively high on-chip storage requirement and the computing power which is too low for many algorithms because of the small number of parallel arithmetic units. When more than four parallel signal processors are used, the communications outlay and, thus, the chip area are increased more than proportionally in the process.

Furthermore, the publication Microprocessor Report, The Insider's Guide to Microprocessor Hardware, Volume 8, No. 13, Oct. 3, 1994, pages 5 to 9, discloses an extensively pipelined superscalar 64 bit RISC processor having two integer and three floating point units, which is expanded by two graphics units, namely an addition/subtraction unit and a multiplication unit for parallel integer calculations. On account of the limited number of register ports, only two floating point or graphics instructions can be processed simultaneously. This means that the computing power is inadequate for many image-processing requirements.

Similarly, Microprocessor Report, Dec. 6, 1994, pages 12 to 15, discloses a processor in which partly different execution units are provided, up to five of which can be addressed simultaneously by each instruction. A disadvantage here is a relatively complicated compiler which takes account of all the latencies of the processor and ensures that the parallel instructions utilize the hardware optimally and in a manner free from conflict.

Proceedings of the Conference on Visual Communication and Image Processing (VCIP'94), Chicago, 1994, pp. 1753 to 1765 and Proceedings of the IEEE 1993, Custom Integrated Circuit Conference, San Diego, Calif., May 9 to 12, 1993, pages 4.6.1 to 4.6.3 discloses extensively parallel one-dimensional SIMD processor arrays having a local memory and high data rates between the local memory and the processor element. In such processes, complicated operations are assembled from individual operations wherein the longer execution time of these compound operations is compensated for by a high number of processor elements. In the first case, a global matrix memory is present which permits the distribution of two-dimensional image sections to the individual processor elements. In the second case, a global communications capability permits the multiple utilization of data loaded once and reduces the required wiring bandwidth between processor array and external storage devices. Disadvantages here are difficult programming, complicated control for pipelined processor elements, the low frequency in the case of non-pipelined processor elements and a large on-chip memory.

SUMMARY OF THE INVENTION

The present invention is therefore based on the object of specifying an image-processing processor which affords the highest possible processing speed for the methods frequently required in image processing in conjunction with a low chip area requirement.

Particular advantages of the invention are primarily the easy scalability and reconfigurability of the system for different data formats, and the suitability for constructing low-cost systems such as, for example, for an image-processing system or for a neurocomputer in which essentially only standard memory chips are required in addition to the processor of the present invention. A significant advantage is the possibility of real-time processing of the above-mentioned computation-intensive image-processing algorithms.

Accordingly, in an embodiment of the present invention, a processor element is provided which is one of a plurality of processor elements arranged in a matrix as part of an image-processing processor. The processor element includes: a first arithmetic logic unit having a first input for input data; a multiplier/adder unit having an input for the input data and having an output connected to a second input of the first arithmetic logic unit; a second arithmetic logic unit having an input for the input data and having an output connected to an input of the multiplier/adder unit; a local general purpose memory supplied with calculation data via a global bus and having an output connected to a second input of the second arithmetic logic unit; a register bank having outputs to supply output data, the outputs connected to inputs of at least one of the local general purpose memory, the second arithmetic logic unit and the multiplier/adder unit; and a storage unit of a distributed image section buffer having an output connected to a first input of the second arithmetic logic unit and having inputs for receipt of image data wherein the inputs are connected to neighboring storage units of respectively neighboring processor elements or connected to a pixel bus if a neighboring processor element is not present.

In an embodiment, an input word length is selected for association with the storage unit, the general purpose memory, the second arithmetic logic unit and the multiplier/adder unit. Multi-component vectors of the input data may be processed in parallel in the second arithmetic logic unit and the multiplier/adder unit depending on the input word length selected.

In an embodiment, the multiplier/adder unit further includes a plurality of multipliers operating in parallel wherein the plurality of multipliers have a corresponding plurality of outputs which are combined by an adder tree.

In an embodiment, an input data bus is connected to the pixel bus via a cache memory.

In an embodiment, the processor element, if in a last column of the matrix, may be connected via a multiplexer to an output of a neighboring processor element of the same row or of the same column of the matrix. Further, an output of a last processor element having no following processing element in either a horizontal or vertical direction of data flow is connected to an evaluation unit.

In an embodiment, a plurality of electronic switches and a plurality of multiplexers are provided via which may be formed at least two of each of groups of processor elements, separate global buses, separate pixel buses, separate cache memories and separate evaluation units.

Additional features and advantages of the present invention are described in, and will be apparent from, the Detailed Description of the Preferred Embodiments and the Drawings.

DESCRIPTION OF THE DRAWINGS

FIG. 1 shows a block diagram of a processor element of an image-processing processor according to the present invention.

FIG. 2a shows a first part of a detailed circuit of a processor element according to FIG. 1.

FIG. 2b shows a second part of a detailed circuit of a processor element according to FIG. 1.

FIG. 3 shows a first configuration of a processor according to the present invention.

DETAILED DESCRIPTION OF THE PREFERRED EMBODIMENTS

Figure 4:
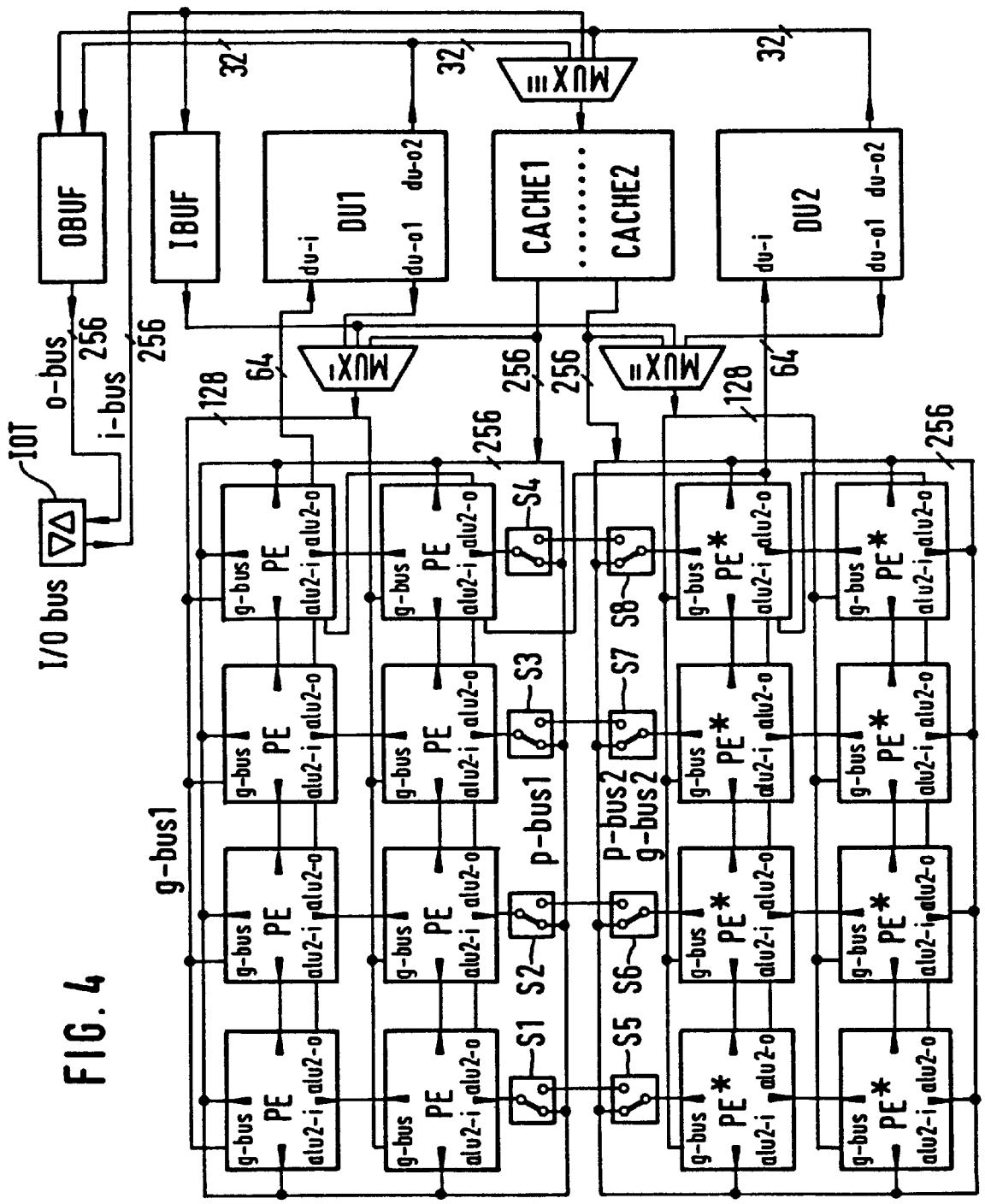
FIG. 4 shows a second configuration of a processor according to the present invention.

FIG. 1 shows the block diagram of a processor element of an image-processing processor according to the present invention, which has an arithmetic logic unit (ALU) ALU2, a register bank REGS, part of a distributed image section buffer ISB, a general purpose memory GPM, a further arithmetic logic unit ALU1 and a multiplier/adder unit MA.

The arithmetic unit ALU2 typically has an addition section ADD, a barrel rotator ROT for shifting the range of values, a saturation device SAT for bit width matching, a detector DET for defining the msb and 1sb (most significant bit and least significant bit, respectively) and a logic unit LU.

The multiplier/adder unit MA typically comprises a multiplier array MULTA having a series of individual multipliers whose individual results are combined to form an overall result by an adder tree ADDT connected downstream.

The buffer ISB may be understood to be a two-dimensional bidirectional shift register which, for example, can hold information for 2×2 pixels. Image data can be written to and read from the buffer ISB via input/output ports im-down and im-up in the vertical direction and via input/output ports im-left and im-right in the horizontal direction.

The memory GPM is a standard memory provided on-chip which serves as second local data source in the processor element and is supplied via a global bus g-bus. The memory GPM contains coefficients, circuit cores, bit masks, weighting matrices for neural networks, etc. Both in the case of the buffer ISB and in the case of the memory GPM, a read access takes place not for individual data, but rather to multicomponent vectors, depending on the data format.

The image section buffers of all the processor elements represent, in their entirety, a distributed two-dimensional image section buffer. The image section can be shifted pixel by pixel upwards/downwards or to the left/to the right via the local connections between the processor elements. For this purpose, for an image section of edge length n, n pixels must be subsequently provided at a respective edge of the cell array of the buffer ISB. The processor elements can only effect a read access to their image segment. An access enables not just an individual pixel to be read, but rather a vector or an array of pixels depending on the pixel format, that is to say, depending on the accuracy.

The data from the local buffer ISB and memory GPM are fed to the further arithmetic logic unit ALU1, which is connected on the output side to inputs of the multiplier/adder unit MA. The output of the multiplier/adder unit is connected to the input side of the arithmetic logic unit ALU2, the output of which is connected to the register bank REGF. Outputs of the register bank REGF are, at the same time, outputs alu2-o of the processor element. The outputs of the register bank REGF and inputs alu2-i of the processor element are connected to inputs of the arithmetic logic unit ALU2.

In addition, in a further embodiment, the inputs alu2-i and/or the outputs of the register bank REGF can be connected to inputs of the further arithmetic logic unit ALU1.

In another embodiment, the inputs alu2-i and/or the outputs of the register bank REGF can be connected to inputs of the multiplier/adder unit MA.

In yet another embodiment, the inputs alu2-i and/or the outputs of the register bank REGF can be connected both to inputs of the further arithmetic logic unit ALU1 and to inputs of the multiplier/adder unit MA.

A detailed example of a processor element of an image-processing processor according to the present invention is shown in FIGS. 2a and 2b. FIG. 2a essentially encompasses the buffers ISB and memory GPM, the further arithmetic logic unit ALU1 and the multiplier/adder unit MA. FIG. 2b essentially encompasses the arithmetic logic unit ALU2 and the register bank REGF. Additionally present are a number of registers CREG, MSBREG and STAT, formatters F1 . . . F4, expanders EXP1 . . . EXP3 and multiplexers MUX0 . . . MUX6, which are added to the arithmetic logic units ALU1 and ALU2 and serve for data selection and word length matching. The input data for the arithmetic logic unit ALU1 in this case originate from two image section buffers ISB1 and ISB2 or from the memory GPM. Two image section buffers are of particular advantage when processing stereo images, for example.

In addition, it is possible in this case to supply the multipliers for 32×32 bit multiplication directly from the result registers of the arithmetic logic unit ALU2 which is done via signals alu2_loc_out1. It is possible to process a maximum of three input vectors in_a, in_b and in_c. A crossbar switch ensures complete flexibility for the selection of these three input vectors.

The image section buffers ISB1 and ISB2 can be reloaded via the ports im-up, im-down, im-right and im-left only by their neighbors or from an image cache. An image section is preloaded into the image section buffers by means of reloading and shifting. Reading in is controlled via a signal in_op, which specifies the different shift directions and the step size.

The memory GPM obtains its data via the global bus g-bus or from the register bank REGF with the registers Reg0 . . . Reg15, which form the result registers for the arithmetic logic unit ALU2. The data format of the output data of the buffers ISB1, ISB2 and memory GPM is identical and forms, for example, a respective vector having a width of 128 bits wherein the vector includes either four 32 bit data items, eight 16 bit data items or sixteen 8 bit data items.

Logic units LU1a and LU1b are controlled by signals alu1a_lop and alu1b_lop and carry out a logic combination of the respective inputs a and b, which are connected via the crossbar switch to the buffers ISB1, ISB2 and memory GPM. The format of the inputs is communicated via a signal alu1_form. For all binary operations, the format of the two inputs must be identical. Each logic unit can thus process sixteen 8 bit or eight 16 bit or four 32 bit data pairs in parallel. The logic units LU1a and Lu1b support the following logic operations, for example:

a, (bypass)

NOTa, (NOT)

a AND b, a NAND b, a OR b, a NOR b, a XOR b, a XNOR b.

An arithmetic unit AU1 carries out an arithmetic combination of the output signals of the logic units LU1a and LU1b. Furthermore, this unit also has auxiliary inputs c and d, the input c being connected to an output of a constant register CREG and the auxiliary input d being connected via the crossbar switch to the buffers/memory. An operation to be carried out in the unit AUI is defined by the signals alu1_aop and the format of the inputs alu1_form. As a result of the possible digit extension, the output format is either 9, 17 or 33 bits, depending on the input formats, and the output vector has a bit width of 136 bits. All of the inputs involved in the operation must have the same format. Thus, sixteen 8 bit or eight 16 bit or four 32 bit data pairs are processed in parallel. The arithmetic unit Aul supports the following operations:

a, (bypass)

−a, (two's complement)

|a|, (absolute value formation)

a+b,

|a+b|,

−a+b,

|−a+b|,

−(a−b),

−a−b, diverse threshold value functions comparison of a with b and output of a, c, d or 0 as a function of the comparison.

A multiplexer MUX0 is used to select, depending on a control signal alu1_o2_sel, either one of the output signals log_a or log_b of the units LU1a or LU1b or a buffer/memory content via the crossbar switch for the multiplier array. The constant register CREG can, for example, store four vectors each of 128 bits. Preloading with the output data item of the arithmetic unit AU1 takes place as a function of a signal creg_op. The register content is output in each clock cycle. The register serves to store frequently recurring constants and to relieve the load on the memory GPM.

The multiplexer MUX1 and MUX2 serves for the selection of the multiplier input data and for the assignment of the multiplier inputs i1 and i2 as a function of the signals mult_i1_sel and mult_i2 sel. As far as the output of the multiplexers, all the data are present in a uniform format, irrespective of whether they are intended for i1 or i2 of the multiplier block. The inputs i1 and i2 have a different format and lead directly to the inputs of the individual multipliers of the multiplier array.

The multiplexers MUX1 and MUX2 can also be used to select the registers of the register bank REGF for 32×32 bit multiplication. The input data of the multiplier array are conditioned by the formatters F1 and F2 as a function of the chosen multiplier configuration, which is defined by the signal mult_form. For configurations in which not all the components of a data vector are processed, it is necessary to select a data segment within a 136 bit word. This is done by means of a signal mult_i1_dat or a signal mult_i2_dat. This control information may be regarded as part of the operand address. For example, given 16×32 bit multiplication, the input i1 of the multiplier requires two 16 bit data items and the input i2 required two 32 bit data items which have to be selected from the supplied eight 16 bit data items for i1 and four 16 bit data items for i2.

The multiplier array MULTA in this case includes eight multipliers, each having a bit width of 16 bits. Depending on the format of the input data, the (partial) results of the multipliers are added up correctly in terms of digit position to form a single overall result in an adder tree ADDT connected downstream. This overall result thus represents the sum of products whose number once again depends on the data format. The sole control word for the multiplier is the signal mult_form for defining the data formats. There is thus internal control of which data fragments, for the multiplication, are to be interpreted as not having a sign or as a two's complement number. The adder tree requires the signal mult_form in order to define the shifting of the individual products prior to addition. Depending on the data format set, the multiplier/adder unit MA calculates the sum from eight 8×8 bit products or eight 8×16 bit products or four 16×16 bit products or four 8×32 bit products or two 16×32 bit products or one 32×32 bit product.

Each of the eight partial products can optionally be blanked out with the aid of the signal add_se1. This is necessary in order to specify individual products in place of a sum of products. The formatter F3 is involved in the transfer of data from the result register REGF to the memory GEM. Depending on the format, the lower 8, 16 or 32 bits of the result data are gathered up by the formatter F3 and transferred to the memory GBM as soon as a 128 bit word is complete. Since the memory GBM also permits the writing of individual data items, it is also possible to effect the transfer without buffer-storage in the formatter F3. The signal format3 is used to communicate how many bits, for example 8, 16 or 32 bits, from the arithmetic logic unit 2 are to be taken into account.

Data sources for the arithmetic logic unit ALU2 in FIG. 2b are formed by the output signal add_tree_out of the adder tree ADDT, the outputs of the result register bank and a random number generator RNDG. The two outputs of the result register bank are connected via buses alu2_bus1 and alu2_bus2 to the arithmetic logic units ALU1 and ALU2 and also to the multiplier/adder unit MA and are supplied either from registers of the respective processor element or of a neighbouring processor element via the inputs alu2_i1 or alu2_i2. The bus alu2_bus1 can additionally be supplied with immediate values from a controller. The four results of a cycle are always stored in a four-segment register of the result register bank, a segment register in each case having 4×64 bits, for example. This result register of the register bank REGF contains four 64 bit words and represents four data items. During the calculation of 128 bit results which arise during the accumulation of 32×32 bit products, one of the registers Reg0 . . . Reg15 contains four 64 more significant bits and a respective neighboring register four 64 less significant bits of four results. Indexed data for minimum/maximum occupy a further register for four index values. The register bank has one input and three output ports. The two buses alu2_bus1 and alu2_bus2 can be supplied with data from the dedicated result registers or from two different neighboring processor elements via a crossbar switch. The data of the neighboring processor elements are available at the ports alu2-i1 and alu2-i2, the selection being effected via the multiplexer MUX5. The third register output leads to the output alu2-o of the processor element which simultaneously represents the connection to the nearest neighboring processor element or to an evaluation unit. Results can be passed through to the evaluation unit; this being required, for example, for a global minimum/maximum search in the event of block matching. The write inputs of the register bank are connected via the multiplexer MUX4 to the output of the arithmetic logic unit ALU2. The read-in and -out order of the four segments of a register is not rigid, but rather is controlled by means of addresses. The register bank of the processor element described here includes sixteen 4-segment registers and, in the case of a processor having 4×4 processor units, signifies a total storage capacity of the registers of 8 kbytes. If the chip area permits it, this number can be increased as desired in a subdivision of 0.5 kByte, better still of 1 kbyte.

In each machine cycle, the user can access one of five function groups which are realized by parallel data paths from a source register to the destination register. The latency of each of these loops is exactly one machine cycle with four clock cycles. The five data paths are:

1. An adder loop with an accumulator-adder ACCADD, a final adder FADD, the multiplexer MUX3, the expanders EXP1 . . . EXP3 and the random number generator RNDG. The functions of the adder loop are accumulation, the minimum/maximum search, the addition of random numbers, rounding and the transfer of the output data of the adder tree into the result registers of the register bank.
2. A shifter/rotator loop with a barrel rotator ROT for arithmetic and logical shifting/rotating and for supporting a minimum/maximum search.
3. A saturation loop for saturating 64 bit values to 8, 16 or 32 bits and for supporting the minimum/maximum search.
4. A detector loop which determines the position of the most significant and least significant bits and makes it possible to identify an overflow during shift operations or saturation operations.
5. A logic loop which permits logic combinations of two operands.

The accumulator-adder ACCADD adds a 66 bit data item at the input i1 to a 67 bit data item at the input i2, or subtracts a data item at the input i2 from a data item at the input i1. The result is a 64 bit data item. A signal acc_op makes the decision between addition and subtraction. The two data items of the inputs i1 and i2 are present in 2's complement representation. The final adder FADD forms a non-redundant 67 bit format from the output data of the accumulator-adder ACCADD, the 64 less significant bits of which are forwarded to the multiplexer MUX4. The register MSBREG buffer-stores the three msbs of the final adder from in each case four data items of a machine cycle. During the addition of data with a doubled range of values, they are fed back into the adder ACCADD in the following cycle in order to complete the operation.

The expander EXP1 generates a 66 bit word in 2's complement representation by expanding the three bits from the register MSBREG, the three bits from the register NSBREG filling the lower three digits and the remaining 63 digits being filled with ones or zeros, depending on the sign. The expanders EXP2 and EXP3 generate a 66 bit word in 2's complement representation from a 64 bit word which is present without a sign or in 2's complement representation. The multiplexer MUX3 selects the input data item for i1 of the accumulator-adder ACCADD as a function of the control signal acc_i1_se1, there being available for selection the bus alu_bus2 via the expander EXP2, the output rnd of the random number generator RNDG, the output of the adder tree or the output of the expander EXP1, in other words the carry from the preceding addition.

The random number generator RNDG generates pseudo-random numbers via a feedback shift register, proceeding from a preloaded start value, which pseudo-random numbers can be added to the data of the bus alu2_bus1. The start value is loaded by means of the signal rnd_ld from the bus alu2_bus1. By means of a signal rnd_op, either new random numbers are generated and output or the generator content is repeatedly output. The random number generator is required for generating statistical rounding effects, such as dithering, for example.

The status register STAT contains flags for sign, overflow and zero result from the final adder. The status bits are calculated before each result and the signal status_op makes the decision as to whether or not they are actually accepted into the status register. The controller can read and evaluate the status bits. However, the status bits can also be made available to the multiplexer MUX4 directly as control input without a detour via the controller, which is advantageous during the minimum/maximum search and other conditional assignments. Arithmetic and logical shifting of the data of the bus alu2_bus1 to the left and right by 0 to 63 digits is possible using the barrel rotator ROT and is controlled with the aid of a signal shift_op. The shift factor is either a constant which comes directly from the signal shift_op, or a variable which is applied from a result register via the bus alu2_bus2. Given a constant shift factor, it is possible to accept the succeeding digits from the bus alu2_bus2. Given identical data on the buses alu2_bus1 and alu2_bus2, rotation results in this way.

The shifter/rotator loop is also involved in the minimum/maximum search or conditional assignments. For this purpose, it is necessary to set a shift factor of 0. The data of the bus alu2_bus2 are fitted by the saturation SAT into a range of values which is specified by the signal sat_op, the range of values of 8, 16 and 32 bits being supported. Data which fall outside a set range are replaced by the largest positive number that can be represented or the smallest negative number that can be represented-saturation. Using the signal det_res of the detector DET, the controller makes the decision as to whether or not saturation is effected and communicates it for each data item via the signal sat_op to the saturation circuit SAT. The logic unit LU carries out a logic combination of the data of the bus alu2_bus1 and the data of the bus alu2_bus2. Under the control of a signal lu_op, the operations AND, NAND, OR, NOR, XOR, XNOR and NOT are possible. Depending on the signal alu2_op, the multiplexer MUX4 decides which of the abovementioned five data paths writes a result to the registers.

The second control input is supplied by the control register STAT and assists during conditional assignments, for example during the minimum/maximum search, the accumulator-adder ACCADD forming the difference between the two buses alu2_bus1 and alu2_bus2 and, with reference to the sign of the difference, selecting whether the data of the bus alu2_bus1 are written to the register bank via the barrel rotator ROT or the data of the bus alu2 bus2 are written to the register bank via the saturation block SAT with saturation switched off. Depending on a signal alu2_in_sel, the multiplexer MUX5 selects one of the inputs alu2_i1 or alu2_i2 of the processor element and thus the neighboring processor element whose data are used as operands. A transfer register TREG can buffer-store four 64 bit words and output them as required via a formatter F4 to the output alu2-o of the processor element. The transfer register TREG furthermore serves as a buffer during readout of the result data and transfer thereof to the neighboring processor element on the right in a row of processor elements. Thus, the result register bank is not burdened and is already available for the following operation. In the formatter F4, the lower 1, 2, 4 or 8 bytes of a register output reg_out of the register bank are moved, depending on a signal format4_form, to a byte position of the formatter output which is defined by the signal format4_pos. The remaining bytes at the output are accepted 1:1 from the transfer register. With the aid of this formatter, it is possible, during the transfer of result data along a row of processor elements, to combine a plurality of results of 1,2 or 4 bytes to form an 8 byte word and, consequently, better to use the 64 bit connection between processor elements.

As a function of the control signal alu2_out_se1, the multiplexer MUX6 selects the output data item for the output alu2-o of the processor element. Output data of the formatter F4 or input data of the processor element are present for selection. The multiplexer MUX6 makes it possible, optionally for one of the two inputs of the processor element to be connectable directly to the output alu2-o of the processor element without buffer-storage in the transfer register.

FIG. 3 shows a processor according to the invention with sixteen processor elements $PE_{11}$ . . . $PE_{44}$, which are interconnected to form a two-dimensional array of edge length 4 and are controlled by a common controller. A pixel bus p-bus with a width of 256 bits is located annularly around the array in order to supply the buffers ISB of the individual processor elements with reload pixels at the four edges of the array. The array receives further input data via the global bus g-bus, which is supplied either from an image cache CACHE or from an input buffer IBUF or from an evaluation unit DU (Data Unit). The evaluation unit DU is used, for example, to carry out divisions, histograms for gray-scale value determinations or evaluations with the aid of tables of values. While the cache memory CACHE has a variety of output modes, the input buffer IBOF serves only as a FIFO between an external store and the memories GMP of the processor elements.

The evaluation unit DU has the task of accepting the result data from the result registers of the processor elements, possibly also of carrying out post-processing and finally of transferring the data via an output buffer to the external store or of making them available again to the processor array via the global bus g-bus. Post-processing includes operations such as division, histogram and table look-up, the implementation of which within the processor elements would be too area- or memory-intensive. The result data of the individual processor elements are transported to the evaluation unit via inputs alu2-i and outputs alu2-o of processor elements. Four processor elements of a row, e.g. the elements $PE_{11}$ . . . $PE_{14}$, form a respective chain via their inputs alu2-i1 and alu2-o. The processor elements $PE_{14}$ . . . $PE_{44}$ of the last column can likewise be interconnected to form a chain via the multiplexers MUX5, so that all the result data can finally pass, via horizontal and vertical forwarding, to the top right processor element $PE_{14}$, and from there to the evaluation unit DU. The same connections are also utilized in the case of global operations such as the extreme value search, the four processor elements of the right-hand column respectively determining the extreme value of their row before the top right processor element then determines the global extreme value.

All sixteen processor elements operate a synchronously without a delay with respect to one another; that is to say, that an operation for all the processor elements is always triggered at the same instant. For outputting or for preloading the result registers via the inputs alu2-i and outputs alu2-o, all the processor elements therefore simultaneously pass their register content to the output and accept in parallel with this the data supplied to them via the inputs. The procedure is similar in the case of global operations, the last processor element in a chain, which processor element carries out the actual operation, logically combining the data of its input with the locally stored result, and-storing the results produced once again locally. The remaining processor elements behave as they do during the outputting of result values.

Processor input data are fed via an input/output driver IOT to an input bus I-bus which supplies the input buffer IBUF and the cache memory CACHE. The global bus g-bus can be connected via a multiplexer MUX either to the output of the input buffer or to the output of the cache memory. The output of the evaluation unit DU is connected via an output buffer OBUF to an output bus o-bus which is, in turn, connected via the input/output driver IOT to the processor output.

FIG. 4 likewise illustrates a processor according to the present invention having sixteen processor elements. Such processor can be configured not only in the manner illustrated in FIG. 3, as a so-called SIMD array (Single Instruction Multiple Data array) in which all the processor elements receive the same instructions, but also with the aid of switches S1 . . . S8, as a so-called MIMD array (Multiple Instruction Multiple Data array). FIG. 4 illustrates an MIMD array having two SIMD arrays each with eight processor elements PE and PE*. Each of these SIMD arrays requires a dedicated controller, a dedicated evaluation unit DU1 and DU2, a dedicated image cache CACHE1 and CACHE2 and additional multiplexers MUX' . . . MUX'''. Each of the two SIMD arrays has its own pixel bus p-bus 1 and p-bus 2 in ring form, which is supplied by a separate cache CACHE1, CACHE2. The caches receive their data either externally via an input bus i-bus or from the evaluation units DU1 and DU2. The feeding of the results of the evaluation unit DU1 into the cache memory CACHE2 makes it possible, for example, to form a processing chain wherein the output data of the SIMD array as the processor elements PE serving as input data for the SIMD array having the processor elements PE*. When permitted by the bandwidth, the two SIMD arrays can carry out different operations, also with external input data, and output the results to the external store again. The processor array having MIMD capability that is described here can be reconfigured via the switches S1 . . . S8 so as to be configured, on the one hand, as two independent blocks having eight processor elements or, on the other hand, as an individual SIND array having sixteen processor units wherein the two pixel buses p-bus1 and p-bus2 are reconfigured via the switches to form a single ring bus. The two caches CACHE1 and CACHE2 can likewise be connected together to form a global cache. The two evaluation units can share the task for the case of the common SIND array.

Although the present invention has been described with reference to specific embodiments, those of skill in the art will recognize that changes may be made thereto without departing from the spirit and scope of the invention as set forth in the hereafter appended claims.

We claim as our invention:

1. A processor element which is one of a plurality of processor elements arranged in a matrix as part of an image-processing processor, the processor element comprising:

a first arithmetic logic unit having a first input for input data;

a multiplier/adder unit having an input for the input data and having an output connected to a second input of the first arithmetic logic unit;

a second arithmetic logic unit having an input for the input data and having an output connected to an input of the multiplier/adder unit;

a local general purpose memory supplied with calculation data via a global bus and having an output connected to a second input of the second arithmetic logic unit;

a register bank having outputs to supply output data, the outputs connected to inputs of at least one of the local general purpose memory, the second arithmetic logic unit and the multiplier/adder unit; and a storage unit of a distributed image section buffer having an output connected to a first input of the second arithmetic logic unit and having inputs for receipt of image data wherein the inputs are connected to neighboring storage units of respectively neighboring processor elements or connected to a pixel bus if a neighboring processing element is not present.

2. A processor element as claimed in claim 1, wherein an input word length is selected for association with the storage unit, the general purpose memory, the second arithmetic logic unit and the multiplier/adder unit, and wherein multi-component vectors of the input data may be processed in parallel in the second arithmetic logic unit and the multiplier/adder unit depending on the input word length selected.

3. A processor element as claimed in claim 1, wherein the multiplier/adder unit further comprises a plurality of multipliers operating in parallel, the plurality of multipliers having a corresponding plurality of outputs which are combined by an adder tree.

4. A processor element as claimed in claim 1, further comprising an input data bus connected to the pixel bus via a cache memory.

5. A processor element as claimed in claim 1, wherein the processor element, if in a last column of the matrix, may be connected via a multiplexer to an output of a neighboring processor element of the same row or of the same column of the matrix, and wherein an output of a last processor element having no following processor element in either a horizontal or vertical direction of data flow is connected to an evaluation unit.

6. A processor element as claimed in claim 1, further comprising a plurality of electronic switches and a plurality of multiplexers via which may be formed at least two of each of groups of processor elements, separate global buses, separate pixel buses, separate cache memories and separate evaluation units.

* * * * *